(12) United States Patent
Sathian

(10) Patent No.: US 7,506,793 B2
(45) Date of Patent: Mar. 24, 2009

(54) PREFORM AND METHOD OF REPAIRING NICKEL-BASE SUPERALLOYS AND COMPONENTS REPAIRED THEREBY

(75) Inventor: Sujith Sathian, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/867,141

(22) Filed: Oct. 4, 2007

(65) Prior Publication Data
US 2008/0237306 A1 Oct. 2, 2008

Related U.S. Application Data

(62) Division of application No. 10/905,143, filed on Dec. 17, 2004, now Pat. No. 7,335,427.

(51) Int. Cl.
*B23K 31/02* (2006.01)
(52) U.S. Cl. .................. 228/119; 228/260; 228/261; 228/193; 228/262; 228/262.45; 228/194; 228/248.1; 75/338
(58) Field of Classification Search .............. 228/262, 228/262.45, 260, 261, 193, 194, 119, 248.1; 75/338
See application file for complete search history.

(56) References Cited

U.S. PATENT DOCUMENTS

| | | | | |
|---|---|---|---|---|
| 4,830,934 A | * | 5/1989 | Ferrigno et al. | 428/678 |
| 5,529,237 A | * | 6/1996 | Yashima et al. | 228/115 |
| 5,812,926 A | * | 9/1998 | Wukusick et al. | 428/548 |
| 5,916,518 A | * | 6/1999 | Chesnes | 420/438 |
| 6,060,174 A | * | 5/2000 | Sabol et al. | 428/610 |
| 6,365,285 B1 | * | 4/2002 | Chesnes | 428/668 |
| 6,551,372 B1 | * | 4/2003 | Ewing et al. | 75/246 |
| 2002/0119338 A1 | * | 8/2002 | Hasz et al. | 428/558 |
| 2002/0189722 A1 | * | 12/2002 | Hasz et al. | 148/528 |

* cited by examiner

*Primary Examiner*—Kiley Stoner
*Assistant Examiner*—Erin B Saad
(74) *Attorney, Agent, or Firm*—Hartman & Hartman, P.C.; Gary M. Hartman; Domenica N. S. Hartman

(57) ABSTRACT

A process for repairing a turbine component of a turbomachine, as well as a sintered preform used in the process and a high gamma-prime nickel-base superalloy component repaired thereby. The sintered preform contains a sintered mixture of powders of a cobalt-base braze alloy and a cobalt-base wear-resistant alloy. The braze alloy constitutes at least about 10 up to about 35 weight percent of the sintered preform and contains a melting point depressant such as boron. The preform is formed by mixing powders of the braze and wear-resistant alloys to form a powder mixture, and then sintering the powder mixture. To use the preform, a surface portion of the turbine component is removed to expose a subsurface portion, followed by diffusion bonding of the preform to the subsurface portion to form a wear-resistant repair material containing the braze alloy dispersed in a matrix of the wear-resistant alloy.

8 Claims, 1 Drawing Sheet

PREFORM AND METHOD OF REPAIRING NICKEL-BASE SUPERALLOYS AND COMPONENTS REPAIRED THEREBY

This is a division patent application of U.S. patent application Ser. No. 10/905,143, filed Dec. 17, 2004 now U.S. Pat. No. 7,335, 427.

BACKGROUND OF THE INVENTION

The present invention generally relates to superalloy structures subject to excessive wear, such as components of gas turbines and other turbomachinery. More particularly, this invention relates to a method of repairing worn surfaces of a gas turbine bucket formed of nickel-base superalloys that are prone to cracking when welded.

Superalloys are used in the manufacture of components that must operate at high temperatures, such as buckets, nozzles, combustors, and transition pieces of industrial gas turbines. During the operation of such components under strenuous high temperature conditions, various types of damage or deterioration can occur. For example, wear and cracks tend to develop on the angel wings of latter stage buckets as a result of rubbing contact between adjacent nozzles and buckets. Because the cost of components formed from superalloys is relatively high, it is typically more desirable to repair these components than to replace them. For the same reason, new-make components that require repair due to manufacturing flaws are also preferably repaired instead of being scrapped.

Methods for repairing nickel-base superalloys have included gas tungsten arc welding (GTAW) techniques. GTAW is known as a high heat input process that can produce a heat-affected zone (HAZ) in the base metal and cracking in the weld metal. A filler is typically used in GTAW repairs, with the choice of filler material typically being a ductile filler or a filler whose chemistry matches the base metal. An advantage of using a ductile filler is the reduced tendency for cracking. An example of weld repair with a ductile filler is the use of IN617 and IN625 superalloys to repair worn angel wings of buckets cast from IN738 and equiaxed nickel-base superalloys such as GTD-111. A significant advantage of using a filler whose chemistry matches the base metal is the ability to more nearly maintain the desired properties of the superalloy base material. An example of this approach is weld repairing GTD-111 superalloy buckets with weld wires formed of GTD-111 or Rene 80 superalloy. To reduce the likelihood of cracking, the base metal typically must be preheated to a high temperature, e.g., about 700 to 930° C. With either approach, the GTAW process can distort the base metal due to the build up of high residual stresses. Components with complex geometries, such as buckets of gas turbines, are less tolerant of distortion, to the extent that GTAW may not be a suitable repair method, particularly if a ductile filler cannot be used.

More advanced directionally-solidified (DS) nickel-base superalloys are often not as readily weldable as the GTD-111 superalloy, further increasing the risk of cracking in the weld metal and within the HAZ of the base metal. A notable example is the nickel-base superalloy GTD-444, which is finding use for latter stage (e.g., second or third stage) buckets in advanced industrial gas turbines due to its desirable creep resistance properties. GTD-444 is not readily weldable primarily due to its higher gamma prime (γ') content (about 55 to 59%), and previous attempts to weld it have produced unacceptable cracking in the base metal HAZ and weld metal.

In view of the above, alternative repair methods are required to repair high gamma-prime nickel-base superalloys that will yield crack-free repairs. For repairing the wear-prone surfaces of such superalloys, it is also necessary that the repair material also exhibit excellent wear properties. One such approach is termed activated diffusion healing (ADH), examples of which are disclosed in commonly-assigned U.S. Pat. Nos. 5,902,421 and 6,530,971. The ADH process employs an alloy powder or mixtures of powders that will melt at a lower temperature than the superalloy component to be repaired. If two powders are combined, one of the powders is formulated to melt at a much lower temperature than the other powder, such that upon melting a two-phase mixture is formed. Vacuum brazing causes the braze powder mixture to melt and alloy together and with the superalloy of the component being repaired. A post-braze diffusion heat treatment cycle is then performed to promote further interdiffusion, which raises the remelt temperature of the braze mixture.

Another alternative repair approach disclosed in commonly-assigned U.S. Pat. No. 6,398,103 to Hasz et al., involves brazing a wear-resistant foil to a worn surface of a component. The foil is formed by thermal spraying a wear-resistant material on a support sheet. Suitable wear-resistant materials include chromium carbide materials and Co—Mo—Cr—Si alloys, such as the commercially-available TRIBALOY® T400 and T800 alloys. Still another approach disclosed in commonly-assigned U.S. patent application Ser. No. 10/708,205 involves the use of a braze tape formed by firing a pliable sheet containing powders of a braze material and a wear-resistant alloy in a binder. The tape is applied to the repair surface, after which a heat treatment is performed to cause the braze tape to diffusion bond to the repair surface so as to define a built-up surface, which can then be machined to the desired dimensions for the repair.

With the advent of more highly alloyed superalloys, improved repair methods and materials are required that are specialized for the particular surface being repaired, including the superalloy and the strength and microstructure required by the repair. A notable example is the need for materials and processes tailored to perform repairs on components with complex geometries and formed of superalloys having high gamma-prime contents, such as GTD-444.

BRIEF SUMMARY OF THE INVENTION

The present invention provides a process capable of repairing a surface of a turbine component of a turbomachine, as well as a sintered preform used in the process and the turbine component repaired by the process. The process and preform are particularly well suited for repairing a turbine component formed of a nickel-base superalloy having a high gamma-prime content, a particular example of which is the GTD-444 superalloy. The process of the invention can be carried out at temperatures that are sufficiently low to minimize distortion, which is particularly advantageous when repairing complex geometries, such as the angel wings of a bucket of an industrial gas turbine.

The sintered preform employed in the invention consists essentially of a sintered mixture of powders of a cobalt-base braze alloy and a cobalt-base wear-resistant alloy. The cobalt-base braze alloy constitutes at least about 10 up to about 35 weight percent of the sintered preform and contains a sufficient amount of boron so that the cobalt-base braze alloy has a melting temperature of about 2000° F. up to about 2230° F. (about 1090° C. up to about 1220° C.).

A process for using the sintered preform to repair a turbine component of a gas turbine involves preparing the sintered preform by mixing powders of the above-noted cobalt-base braze alloy and cobalt-base wear-resistant alloy to form a powder mixture, of which at least about 10 up to about 35 weight percent is the cobalt-base braze alloy, and then sintering the powder mixture to form the sintered preform. Use of the preform involves removing a surface portion of the turbine component to expose a subsurface portion of the turbine component, and then diffusion bonding the sintered preform to the subsurface portion of the turbine component to form a wear-resistant repair material consisting of the cobalt-base braze alloy dispersed in a matrix of the wear-resistant cobalt-base alloy. Thereafter, machining of the repair material can the performed to obtain desired final dimensional and surface properties.

The resulting repaired turbine component is preferably a nickel-base superalloy having a composition and gamma-prime content that renders the turbine component prone to cracking if subjected to gas tungsten arc welding. Such a repaired turbine component is characterized by having a region with the wear-resistant repair material diffusion bonded thereto, in which the wear-resistant repair material consists of the cobalt-base braze alloy dispersed in a matrix material of the wear-resistant cobalt-base alloy.

In view of the above, it can be seen that the invention provides a process and material for repairing an advanced nickel-base superalloy that is prone to cracking if an attempt were made to weld repair the superalloy, particularly if using a filler material with properties similar to the base metal. Instead of welding, the invention employs a diffusion bonding cycle that avoids the thermal stresses and distortion induced by welding, yet yields a repaired region whose properties are closer to that of the base metal than would be possible if a weld repair was performed with a ductile filler material.

Other objects and advantages of this invention will be better appreciated from the following detailed description.

DETAILED DESCRIPTION OF THE INVENTION

Figure 1:
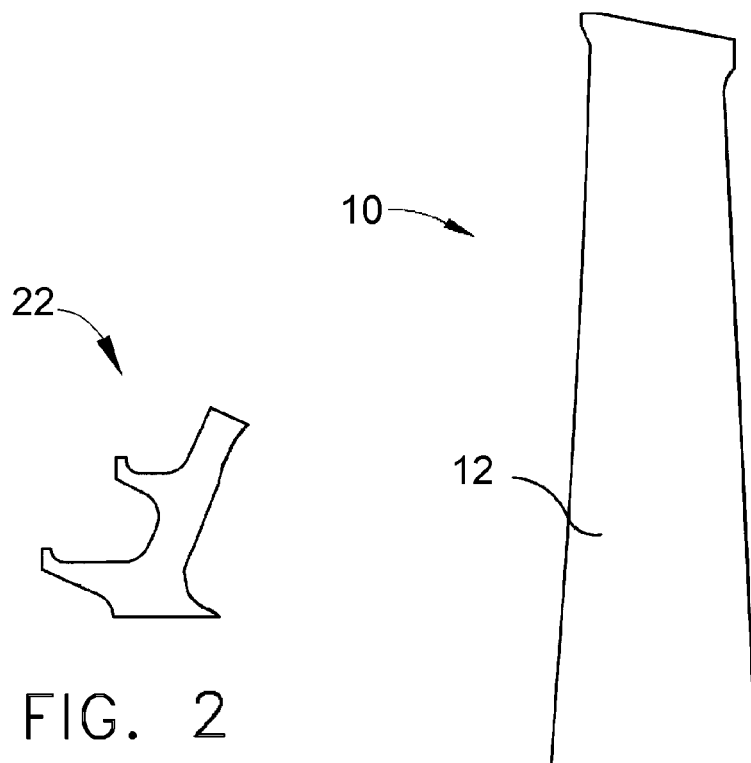
FIG. 1 is a side view of a casting for a third stage bucket prepared for repair in accordance with a repair process of this invention.

FIG. 1 represents a third stage turbine bucket 10 of a type used within the turbine section of an industrial gas turbine. The bucket 10 is represented as a casting prior to final machining, and includes an airfoil 12 extending from a root portion 14. Various high-temperature materials can be used to form the bucket 10, notable examples of which include the commercially-known GTD-111 and GTD-444 nickel-base superalloys. The present invention is particularly concerned with components formed of highly alloyed nickel-base superalloys having high gamma-prime contents, such as GTD-444, whose nominal composition, in weight percent, is about 9.5-10% chromium, about 7-8% cobalt, about 3.35-3.65% titanium, about 4.1-4.3% aluminum, about 5.75-6.25% tungsten, about 1.30-1.705 molybdenum, about 4.60-5.0% tantalum, about 0.06-0.1% carbon, about 0.008-0.010% zirconium, about 0.008-0.0105% boron, and the balance being nickel and incidental impurities. The GTD-444 is formulated as a directionally-solidified (DS) alloy, and has a high gamma-prime content (about 55 to 59%). The high gamma-prime content of a superalloy such as GTD-444 renders the superalloy susceptible to cracking when an attempt is made to perform a weld repair. The invention also concerns the repair of nickel-base superalloy components having complex geometries, and are therefore susceptible to distortion if a weld repair is attempted. When formed of GTD-444, the bucket 10 depicted in FIG. 1 is an example of both complicating circumstances, particularly in the region surrounding the angel wings 16, whose complex geometries can be easily distorted by welding.

As known in the art, the angel wings 16 are configured for sealing with adjacent nozzle stages (not shown) of the gas turbine in which the bucket 10 is installed. Each wing 16 terminates in a tip 18 that is subjected to damage from rubbing contact with seals on the adjacent nozzles. Contact between the tips 18 and nozzle is characterized by high compression forces and relative movement as a result of manufacturing tolerances, differing rates of thermal expansion, and dynamic effects during operation of the turbine. As such, the angel wings 16 and their tips 18 are prone to damage that necessitates repair. For this purpose, the bucket 10 is shown with a surface region removed on its root portion 14, exposing a subsurface region 20 that encompasses both angel wings 16 on one side of the bucket 10. As such, FIG. 1 represents a first step of a process for repairing the bucket 10, by which worn or damaged surface portions of the wings 16 have been removed.

Figure 2:
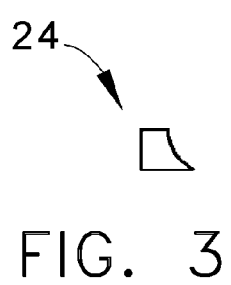
FIGS. 2 and 3 represent sintered preforms suitable for repairing the bucket of FIG. 1.
Figure 3:
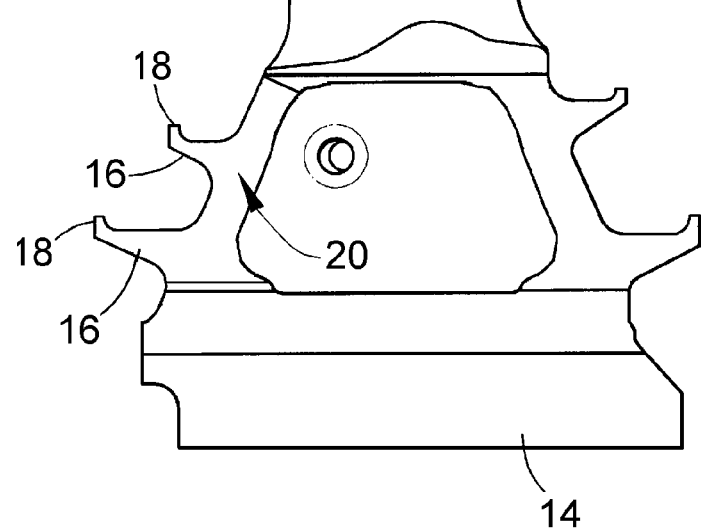

FIG. 2 depicts a sintered preform 22 sized and shaped to replace the base material that was removed to expose the subsurface region 20 in FIG. 1. A preform 24 configured for repairing only the tip 18 of an angel wing 16 is depicted in FIG. 3 (not shown to the same scale as FIGS. 1 and 2). According to the present invention, the preforms 22 and 24 contain up to about 90 weight percent of a wear-resistant cobalt-base alloy, and the balance essentially a cobalt-base braze alloy containing a melting point depressant, preferably boron, to enable diffusion bonding of the preforms 22 and 24 to the bucket 10 at temperatures below the recrystallization temperature of the base superalloy, which is about 1230° C. for GTD-444. As used herein, the term cobalt-base specifies an alloy whose predominant constituent is cobalt. Preferred properties of the braze alloy include a melting temperature of up to about 1220° C., compatibility with GTD-444, moderate wear properties, hardness, and oxidation resistance, machinability, and low tendency for cracking. A preferred braze alloy is based on the commercially known, superalloy Mar M 509B, and has a nominal composition, by weight, of about 24% chromium, about 10.8% nickel, about 7.5% tungsten, about 4% tantalum, about 0.25% titanium, about 2.7% boron, about 0.6% carbon, the balance cobalt and incidental impurities. Suitable compositional ranges for the constituents of the braze alloy of this invention are, by weight, about 22.00 to about 24.75% chromium, about 9.0 to about 11.0% nickel, about 6.5 to about 7.6% tungsten, about 3.0 to 4.0% tantalum; about 2.60 to 3.16% boron, about 0.55 to about 0.65% carbon, about 0.15 to 0.30% titanium, about 0.30 to 0.60% zirconium, up to 1.3% iron, up to 0.4% silicon, up to 0.10% manganese, up to 0.015% sulfur, and the balance cobalt and incidental impurities.

Because of the presence of the braze alloy in the preforms 22 and 24, the wear-resistant alloy may have a melting temperature that exceeds the melting temperature of the braze alloy though less than the GTD-444 base metal, e.g., above 1090° C. but less than 1315° C. Preferred properties of the wear-resistant alloy include compatibility with GTD-444, low tendency for cracking, moderate wear properties, hardness, and oxidation resistance, and machinability. Two cobalt alloys based on commercially known hardface materials are identified with this invention as being suitable for use as the wear-resistant alloy. A first is based on a cobalt-base alloy commercially available from the Deloro Stellite Company, Inc., under the name TRIBALOY® T800. The T800-type alloy contains, by weight, about 27 to about 30% molybdenum, about 16.5 to about 18.5% chromium, about 3.0 to about 3.8% silicon, up to 1.5% iron, up to 1.5% nickel, up to 0.15% oxygen, up to 0.03% sulfur, up to 0.03% phosphorus, and up to 0.08% carbon, the balance cobalt and incidental impurities. A preferred composition for a T800-type wear-resistant alloy for use in this invention is, by weight, about 29% molybdenum, about 18% chromium, about 3.5% silicon, about 0.08% carbon, and the balance cobalt and incidental impurities. The second alloy suitable for use as the wear-resistant alloy of this invention is based on a cobalt alloy commercially available from various sources under the name CM 64, an example of which is available from the Deloro Stellite Company, Inc., under the name STELLITE® 694. A suitable composition for a CM 64-type wear-resistant alloy is, by weight, about 26.0 to about 30.0% chromium, about 18.0 to about 21.0% tungsten, about 4.0 to about 6.0% nickel; about 0.75 to about 1.25% vanadium, about 0.7 to about 1.0% carbon, up to 3.0% iron, up to 1.0% manganese, up to 0.5% molybdenum, up to 1.0% silicon, up to 0.05% boron, and the balance cobalt and incidental impurities. A preferred composition for a CM 64-type alloy is, by weight, about 28% chromium, about 19.5% tungsten, about 5% nickel, about 1% vanadium, about 0.85% carbon, and the balance cobalt and incidental impurities.

The preforms 22 and 24 are formed by mixing powders of the braze and wear-resistant alloys. Suitable particle size ranges for the braze and wear-resistant alloy powders are −325 mesh size. The braze alloy is present in the preforms 22 and 24 in an amount to achieve metallurgical bonding with the wear-resistant alloy and the base metal of the bucket 10 by boron diffusion. A lower limit for the braze alloy content in the preforms 22 and 24 is about 10 weight percent in order to limit porosity to an acceptable level within the preform. In excess of about 35 weight percent of the preforms 22 and 24, the braze alloy can undesirably reduce the mechanical and environmental properties of the repair. In a preferred embodiment, the braze alloy content of the preform is about 15 weight percent. Aside from the braze and wear-resistant alloys, no other constituents are required in the making of the preforms 22 and 24.

After mixing, the powders undergo sintering to yield preforms 22 and 24 with good structural strength and low porosity, preferably under two volume percent. During sintering, the powders are compressed to promote fusion and reduce porosity in the preforms 22 and 24. Based on the preferred preform compositions containing about fifteen weight percent braze alloy, the preforms 22 and 24 (and therefore repairs formed by the preforms 22 and 24) have the following nominal compositions (excluding incidental impurities).

|    | T800-type Preform | CM 64-type Preform |
|----|---|---|
| Cr | 18.5% | 27.6% |
| Ni | 0.92 | 5.5 |
| W  | 0.64 | 18.9 |
| Ta | 0.34 | 0.36 |
| Ti | 0.021 | 0.023 |
| Mo | 26.5 | — |
| Si | 3.2 | — |
| Fe | — | 2.7 |
| V  | — | 0.91 |
| B  | 0.23 | 0.24 |
| C  | 0.12 | 0.87 |
| Co | Balance (about 49.5%) | Balance (about 42.8%) |

In an investigation leading up to this invention, directionally-solidified buckets essentially of the type shown in FIG. 1 and formed of the GTD-444 superalloy were machined by electrical-discharge machining (EDM) to a depth of about 0.1 inch (about 2.5 mm) to remove a surface region of the root section, essentially as represented in FIG. 1. Following EDM, the exposed regions were ground to completely remove the recast layer formed during EDM, and then cleaned with acetone. The exposed regions were then subjected to grit blasting with a nickel-chromium-iron grit commercially available under the name NicroBlast® from Wall Colmonoy Corp. The grit blasting operation was performed to clean the exposed regions, create compressive stresses at the surface to enhance brazeability, and deposit a smooth nickel coating that enhances the wettability of the exposed regions. The NicroBlast® powder had a particle size of −60 mesh, though smaller and larger particle sizes could foreseeably be used.

For the investigation, two different preform formulations were evaluated. The formulations contained either about 15 or about 10 weight percent of the braze alloy, with the balance the above-noted T800-type or CM 64-type wear-resistant alloy, respectively. More particularly, the braze alloy had a nominal composition of, by weight, about 24% chromium, about 10.8% nickel, about 7.5% tungsten, about 4% tantalum, about 0.25% titanium, about 2.7% boron, about 0.6% carbon, the balance cobalt and incidental impurities. The T800-type wear-resistant alloy used had a nominal composition of, by weight, about 29% molybdenum, about 18% chromium, about 35% silicon, about 0.08% carbon, and the balance cobalt and incidental impurities. The CM 64-type wear-resistant alloy had a nominal composition of, by weight, about 28% chromium, about 20% tungsten, about 5% nickel, about 3% iron, about 1% vanadium, about 0.9% carbon, and the balance cobalt and incidental impurities.

The powders were then mixed and underwent sintering in molds to produce preforms having thicknesses of about 0.1 inch (about 2.5 mm), and a porosity of less than two volume percent. After cutting the preforms by water jet and EDM to obtain shapes similar to that shown in FIG. 2, the preforms were tack-welded to the exposed surface regions of the buckets.

The preforms were diffusion bonded to the exposed surface regions using one of two vacuum heat treatments. The heat treatment for the preforms containing the T800-type wear-resistant alloy comprised heating at a rate of about 25° F./min (about 14° C./min) to a soak temperature of about 1200° F. (about 650° C.) held for about thirty minutes, heating at a rate of about 25° F./min to a soak temperature of about 1800° F. (about 980° C. held for about thirty minutes, heating at a rate of about 35° F./min (about 20° C./min) to a maximum soak temperature of about 2210° F. (about 1210° C.) held for about twenty minutes, furnace cooling to a temperature of about 2050° F. (about 1120° C.) and holding for about sixty minutes, furnace cooling to a temperature of about 1500° F. (about 815° C.), and finally cooling to room temperature. The heat treatment cycle for the preforms containing the CM 64-type wear-resistant alloy was essentially identical except for the use of a maximum soak temperature of about 2240° F. (about 1227° C.). All repairs were machined following heat treatment to about the desired dimensional characteristics.

Metallographic sections of some of the repaired angel wings showed the repairs to be very homogeneous and the entire bond interface to be void free, yielding an excellent metallurgical joint. Other repaired buckets were nondestructively examined by fluorescent penetrant inspection (FPI), which evidenced that the repair and the underlying superalloy base metal were free of cracks.

In a subsequent investigation, the tips of buckets formed of GTD-444 were repaired with a preform formulation containing about 15 weight percent of the braze alloy and the balance the T800-type wear-resistant alloy. Following a braze heat treatment essentially as described above for the previous preform formulation containing the T800-type wear-resistant alloy, the blades were crack-free and the resulting repairs exhibited better wear resistance than the original GTD-444 material.

While the invention has been described in terms of particular embodiments, it is apparent that other forms could be adopted by one skilled in the art. Therefore, the scope of the invention is to be limited only by the following claims.

The invention claimed is:

1. A method of repairing a turbine component of a gas turbine, the method comprising the steps of:

mixing powders of a cobalt-base braze alloy and a cobalt-base wear-resistant alloy to form a powder mixture, the cobalt-base braze alloy constituting about 10 to about 35 weight percent of the powder mixture and containing a sufficient amount of boron so that the cobalt-base braze alloy has a melting temperature of about 1090° C. to about 1230° C., wherein the cobalt-base braze alloy consists of, by weight, about 22.00 to about 24.75% chromium, about 9.0 to about 11.0% nickel, about 6.5 to about 7.6% tungsten, about 3.0 to 4.0% tantalum, about 2.60 to 3.16% boron, about 0.55 to about 0.65% carbon, about 0.15 to 0.30% titanium, about 0.30 to 0.60% zirconium, up to 1.3% iron, up to 0.4% silicon, up to 0.10% manganese, up to 0.015% sulfur, and the balance cobalt and incidental impurities, and wherein the cobalt-base wear-resistant alloy consists of, by weight, about 26.0 to about 30.0% chromium, about 18.0 to about 21.0% tungsten, about 4.0 to about 6.0% nickel, about 0.75 to about 1.25% vanadium, about 0.7 to about 1.0% carbon, up to 3.0% iron, up to 1.0% manganese, up to 0.5% molybdenum, up to 1.0% silicon, up to 0.05% boron, and the balance cobalt and incidental impurities;

sintering the powder mixture to form a sintered preform;

removing a surface portion of the turbine component to expose a subsurface portion of the turbine component; and then diffusion bonding the sintered preform to the subsurface portion of the turbine component to form a wear-resistant repair material consisting of the cobalt-base braze alloy dispersed in a matrix of the wear-resistant cobalt-base alloy.

2. A method according to claim 1, wherein the turbine component is formed of a nickel-base superalloy having a composition and gamma-prime content that causes the turbine component to crack if subjected to gas tungsten arc welding.

3. The method according to claim 2, wherein the gamma-prime content of the nickel-base superalloy is about 55 to 59 volume percent.

4. The method according to claim 1, wherein the powder mixture is subjected to compression during the sintering step to promote fusion and reduce porosity, and the sintered preform has a porosity of less than 2 volume percent.

5. The method according to claim 1, further comprising the step of tack welding the sintered preform to the subsurface portion of the turbine component prior to the diffusion bonding step.

6. The method according to claim 1, further comprising the step of depositing a nickel-containing coating on the subsurface portion of the turbine component prior to the diffusion bonding step.

7. The method according to claim 6, wherein the nickel-containing coating is deposited by abrasive blasting the subsurface portion of the turbine component with a nickel-containing powder.

8. The method according to claim 1, wherein the turbine component is formed of a nickel-base superalloy consisting of, by weight, about 9.5 to about 10 chromium, about 7 to about 8 cobalt, about 3.35 to about 3.65 titanium, about 4.1 to about 4.3 aluminum, about 5.75 to about 6.25 tungsten, about 1.30 to about 1.70 molybdenum, about 4.60 to about 5.0 tantalum, about 0.06 to about 0.1 carbon, about 0.0080 to about 0.010 zirconium, about 0.008 to about 0.0105 boron, and the balance being nickel and incidental impurities.

* * * * *